W. ADRIANCE.
HORSE HAY-RAKES.
No. 195,783. Patented Oct. 2, 1877.
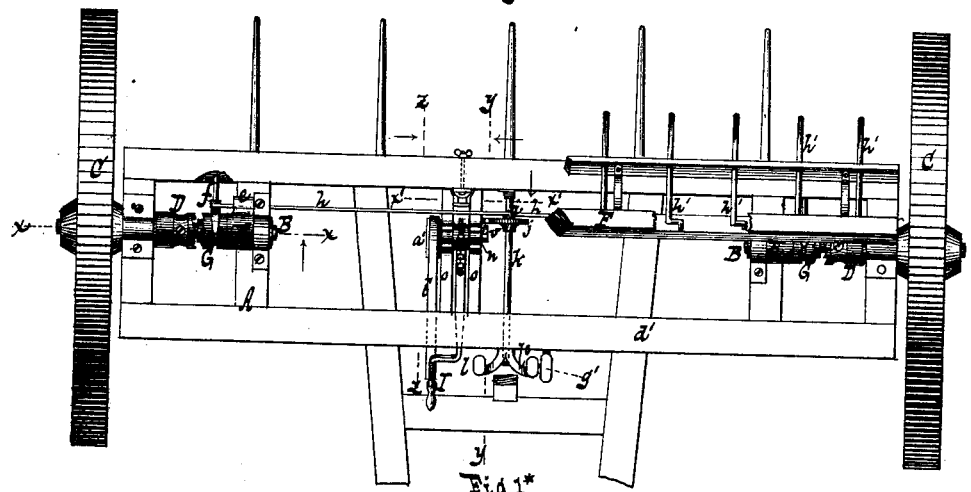
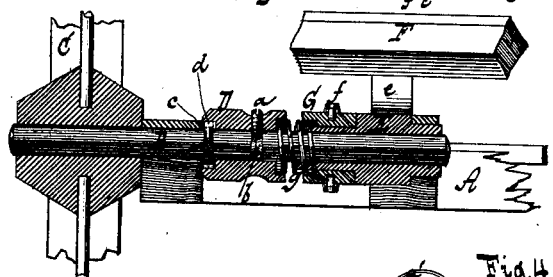
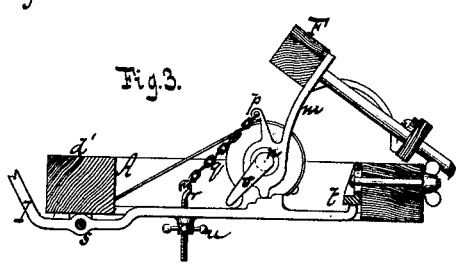
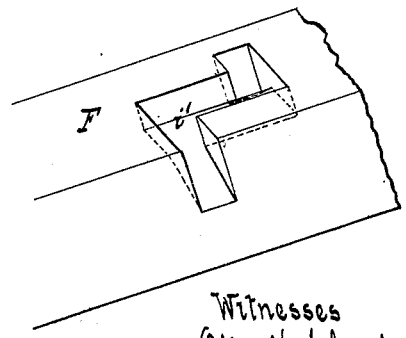
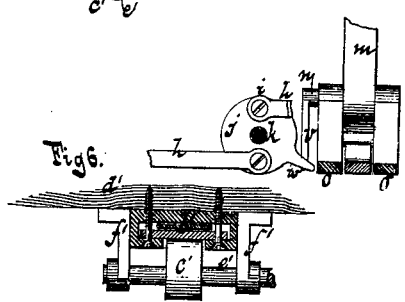
Witnesses
Otto Stufeland
Chas. Nahlers
Inventor.
Walter Adriance by
Van Santvoord & Hauff
his attys

UNITED STATES PATENT OFFICE.

WALTER ADRIANCE, OF POUGHKEEPSIE, NEW YORK.

IMPROVEMENT IN HORSE HAY-RAKES.

Specification forming part of Letters Patent No. 195,783, dated October 2, 1877; application filed August 29, 1877.

*To all whom it may concern:*

Be it known that I, WALTER ADRIANCE, of Poughkeepsie, in the county of Dutchess and State of New York, have invented a new and useful Improvement in Horse-Rakes, which improvement is fully set forth in the following specification, reference being had to the accompanying drawing, in which—

Figure 1 represents a plan or top view. Fig. 1* is a front view of the letting-down mechanism. Fig. 2 is a longitudinal vertical section of one of the wheels and its clutch mechanism in the plane $x\,x$, Fig. 1, on a larger scale than the previous figures. Fig. 3 is a transverse vertical section in the plane $y\,y$, Fig. 1. Fig. 4 is a similar section in the plane $z\,z$, Fig. 1. Fig. 5 is a partial longitudinal section in the plane $x'\,x'$, Fig. 1. Fig. 6 is a front view of the letting-down mechanism. Fig. 7 is a perspective view of a portion of the rake-head.

Similar letters indicate corresponding parts.

This invention consists in the combination, in a horse-rake, of two independent shafts, two wheels mounted firmly on these shafts, two clutch-heads, one for each of said shafts, and connected to the same by ratchet-teeth and pawls, two tubular shafts mounted on the wheel-shafts, and connected to the rake-head, two clutch-slides feathered on the tubular shafts, two forked levers which engage with the clutch-slides, a rock-shaft which carries two foot-levers, extending therefrom in opposite directions, and a disk which is mounted on said rock-shaft, and which carries two eccentric pins that connect with the clutch-levers, so that by depressing one of the foot-levers the clutch-slides are thrown in gear with the clutch-heads, and the rake is raised when the wheels turn forward, and by depressing the other foot-lever the clutch-slides are thrown out of gear, and the rake is lowered, and consequently the operation of raising and lowering the rake can be controlled with the feet; also, in the combination, with the rake-head and the mechanism for throwing the clutch-slides in gear with the clutch-heads, of an intermediate shaft, which connects with the rake-head and carries a toe, so that when the rake is raised this toe acts on the mechanism for throwing the clutch-slides in gear, and the rake-head is released automatically after its contents have been dumped; further, in the combination, with the rake-head, of a friction-brake, whereby the downward motion of the rake-head can be checked and said rake-head can be lowered without producing a sudden blow or shock; further, in the combination, with the rake-teeth, of Z-shaped grooves or recesses for receiving the upper Z-shaped ends of the rake-teeth, so that the lateral movement of the rake-teeth is effectually prevented, while each tooth can be readily taken out without disturbing the others; also, in the combination, with the hand-lever which serves to raise the rake, and with the rake-head, of a chain, an eyebolt, and adjusting-nut, so that by manipulating this nut the elevation of the rake from the ground can be regulated.

In the drawing, the letter A designates the frame of my horse-rake, which forms the bearings for two independent axles or shafts, B B, on the outer ends of which are firmly mounted the wheels C C. On each of these shafts is secured a clutch-head, D, and a tubular shaft, E. The clutch-head is retained by a set-screw, $a$, which engages with a circular groove, $b$, and allows the head to rotate freely in either direction, but prevents it from sliding on the shaft in the direction of its length. The shaft is provided with a socket to receive a spring-pawl, $c$, which engages with ratchet-teeth, $d$, in the clutch-head, so that when the wheel on said shaft turns forward the clutch-head is compelled to revolve with it; but when the wheel turns backward the clutch-head can remain stationary. (See Fig. 2.) The tubular shaft E turns freely on the wheel-shaft B, and it connects, by an arm, $e$, with the rake-head F. On said tubular shaft is feathered the clutch-slide G, which engages with a forked lever, $f$, by means of which it can be thrown in or out of gear with the clutch-head D. Between the clutch-head and its clutch-slide is placed a spring, $g$, which throws the clutch-slide out of gear whenever the forked lever $f$ is released. When the wheels turn forward and the clutch-slides are thrown in gear with their clutch-heads the tubular shafts E are caused to revolve, and the rake-head is raised.

The advantage of my present arrangement is that, by combining with the rake-head the clutch mechanism, and with the independent shafts B B the tubular shafts E E, I am enabled to remove either of the wheel-shafts, together with its wheel, without disturbing the rake-head; and, furthermore, in manipulating the rake the wheel-shafts are relieved from all strain.

The forked clutch-levers $f$ connect, by rods $h$ $h$, with eccentric wrist-pins $i$ $i$, Figs. 1 and 5, which are secured in a disk, $j$, on opposite sides of the rock-shaft $k$, supporting said disk. This rock-shaft extends at right angles to the rake-head, and it is furnished with two foot-levers, $l$ $l^o$, extending in opposite directions. By depressing the lever $l$ the clutches are thrown in gear, and by depressing the lever $l^o$ said clutches are thrown out of gear.

The object of this arrangement is to control the position of the clutch-slides by a positive motion, and to drop the rake at any point of its elevation. When this double treadle is used the springs $g$ between the clutch-heads and their slides can be dispensed with.

The rake-head F connects, by an arm, $m$, Fig. 3, with a shaft, $n$, which has its bearings in suitable boxes secured to two bars, $o$, which are firmly attached to the main frame. From the shaft $n$ extends also an arm, $p$, which connects, by a chain, $q$, with an eyebolt, $r$, that extends through a hand-lever, I. This hand-lever has its fulcrum on a pivot, $s$, and its rear end bears against a stop, $t$. It serves to raise the rake by hand.

The eyebolt $r$ is provided with a thumb-nut, $u$, and by turning this nut the rake can be raised or lowered, and the elevation of the rake-teeth from the ground can be adjusted with great accuracy.

On the shaft $n$ is secured a toe, $v$, and if the rake is raised by the action of the wheels C C, this toe strikes a tooth, $w$, Fig. 5, projecting from the disk $j$, and as soon as the rake has been raised to the desired point, the clutches are thrown out of gear automatically, and the rake is dropped.

On the shaft $n$ is firmly mounted a pulley, $a'$, from which extends a flat flexible strap, $b'$, through between a cam, $c'$, Figs. 1*, 4, and 6, and between the longitudinal bar $d'$ of the frame A. The cam $c'$ is firmly secured on a rock-shaft, $e'$, which has its bearings in lugs $f'$ secured to the bar $d'$, and from this rock-shaft extends a foot-lever, $g'$. By depressing this foot-lever the strap $b'$ is clamped between the cam $c'$ and the bar $d'$, and if the rake has been raised and pressure is applied to the foot-lever $g'$, the descent of the rake is checked, and the rake can be lowered gradually, so as to avoid sudden blows or shocks.

It is obvious that the form of the friction device or brake can be changed in various ways; for instance, the foot-lever $f'$ may be provided with a shoe, which bears on the surface of the pulley $a'$ when the foot-lever is depressed, and I do not wish to be limited in this respect to the precise mechanism shown in the drawing.

The upper ends of the rake-teeth $h'$ are bent so as to assume the form of the letter Z, (see Fig. 1,) and the rake-head is provided with Z-shaped grooves $i'$ (see Fig. 7) corresponding to the ends of the rake-teeth.

After the rake-teeth have all been adjusted in their respective Z-shaped grooves they are locked in by a strip of wood or metal, which is fastened to the rake-head over said grooves. By this arrangement the lateral displacement of the rake-teeth is effectually prevented, the teeth are firmly retained in position, and each of them can be removed and replaced without disturbing the other teeth.

By referring to Fig. 1 it will be observed that the pedal of foot-lever $g'$ is situated in such relation to the pedal $l^o$ that both these pedals can be operated with one foot, so that by depressing the pedal $l^o$ the clutches are thrown out of gear, and, at the same time, by depressing the pedal $g'$, the brake is applied, and the rake can be held in an elevated position or lowered gradually, as may be desired.

What I claim as new, and desire to secure by Letters Patent, is—

1. The combination, in a horse-rake, of two independent shafts; two wheels mounted firmly on these shafts; two clutch-heads, one for each of said shafts, and connected to the same by ratchet-teeth and pawls; two tubular shafts mounted on the wheel-shafts, and connected to the rake-head; two clutch-slides feathered on the tubular shafts; two forked levers, which engage with the clutch-slides; a rock-shaft, which carries two foot-levers extending therefrom in opposite directions; and a disk, which is mounted on said rock-shaft, and which carries two eccentric pins that connect with the clutch-levers, all constructed and adapted to operate substantially as herein shown and described.

2. The combination, with the rake-head, the independent wheel-shafts, and the mechanism for throwing the clutch-slides in gear with their clutch-heads, of an intermediate shaft, which connects with the rake-head, and carries a toe for releasing the clutches automatically, substantially as set forth.

3. The combination, with the rake-head, the mechanism for raising the same by the action of the wheel-shaft, and the releasing mechanism, of a friction-brake adapted to be operated independently of the raising and releasing mechanism, whereby the downward motion of the rake-head may be checked, substantially as described.

4. The combination of Z-shaped grooves in the rake-head with the Z-shaped upper ends of the rake-teeth, substantially as and for the purpose set forth.

5. The combination, with the hand-levers, which serve to raise the rake, and with the rake-head, of a chain, an eyebolt, and an adjusting-nut, substantially as and for the purpose described.

In testimony that I claim the foregoing I have hereunto set my hand and seal this 27th day of August, 1877.

WALTER ADRIANCE. [L. S.]

Witnesses:
 ROBT. N. PALMER,
 DE WITT VARICK.